INVENTOR.
MICHEL E. MAES
BY
ATTORNEYS

INVENTOR.
MICHEL E. MAES
BY
ATTORNEYS

INVENTOR.
MICHEL E. MAES
BY Grayheal, Cole & Barnard
ATTORNEYS

Oct. 7, 1969   M. E. MAES   3,471,106

VALVELESS MICROROCKET SYSTEMS

Original Filed Sept. 24, 1963   4 Sheets-Sheet 4

INVENTOR.
MICHEL E. MAES

BY Graybeal, Cole & Barnard
ATTORNEYS

United States Patent Office 3,471,106
Patented Oct. 7, 1969

3,471,106
VALVELESS MICROROCKET SYSTEMS
Michel E. Maes, Bellevue, Wash., assignor to Rocket Research Corp., Seattle, Wash., a corporation of Washington
Original application Sept. 24, 1963, Ser. No. 311,054. Divided and this application May 28, 1965, Ser. No. 459,685
Int. Cl. B64c 15/12; F03h 5/00; B64g 1/20
U.S. Cl. 244—1   15 Claims

ABSTRACT OF THE DISCLOSURE

The present invention relates to small, noncombustion type reaction jet systems, and more particularly to low thrust rocket systems utilizing a self-feeding, subliming solid propellant to produce reaction propulsion. Specific aspects of the invention pertain to various of the factors involved as to selection of the subliming solid propellant, as to design of system components and as to performance characteristics of rocket systems of this type.

---

This application is a division of copending application Ser. No. 311,054, now abandoned, entitled Microrocket Systems Utilizing Subliming Solid Propellants, filed Sept. 24, 1963.

Satellite mission studies and control system analyses have shown that only very little thrust is required to control satellite attitude, orbital position, or spin rate. In general, attitude control for orbital space vehicles is best performed with a maximum of propellant economy through use of what may be termed microrockets, i.e. a rocket producing thrust on the order of about 10 to $10^{-6}$ pounds thrust.

Presently, the only type of operationally available propellant system for very low thrust applications utilizes cold nitrogen gas as the propellant. The major disadvantages of the cold nitrogen gas system are that it requires a relatively high system weight due to the low density of the propellant and requires a high pressure in the propellant storage tank (typically about 3,000 p.s.i.a. initially), coupled with the additional weight of the necessary pressure regulator mean and control valves. Characteristically, a cold nitrogen gas reaction jet system requires that the weight of the propellant storage tank at least equal the initial weight of the propellant. Another major disadvantage of the cold gas system is the fact that the system contains a multiplicity of moving parts, operating under high pressure, often giving rise to considerable leakage and a low reliability with regard to satisfactory operation over extended periods.

It is a primary feature and advantage of the subliming solid microrocket system of the present invention that it offers better performance, higher reliability, and markedly lower equipment weight than comparable cold nitrogen gas reaction jet systems, the subliming solid rocket system usually requiring a propellant tank weight which is only one-tenth or less of the initial weight of the propellant. Further, the subliming solid microrocket is compact, involves simple system components, is capable of providing higher specific impulse than a cold nitrogen gas system, has a greater propellant density, a generally much lower operating pressure (the exhaust pressure of the subliming solid system in most cases being 15 p.s.i.a. or lower), is stable under storage, and has a longer operating life capability. In addition, in contrast to combustion type bi-propellant reaction jet systems, the subliming solid microrockets of the present invention obviates any need for either ignition or combustion. Further, the subliming solid microrocket of the present invention is self-feeding and is particularly suited to the intermittent pulsing mode of operation characteristic of satellite attitude control.

These and other objects, features, advantages and characteristics of microrockets with subliming solid propellants will be apparent from the following discussion of various suitable subliming solid propellants, component designs, and system characteristics, taken together with the accompanying drawings illustrating certain typical and therefore non-limitive embodiments of the system, wherein like letters and numerals refer to like parts, and wherein.

Figures 8, 9:
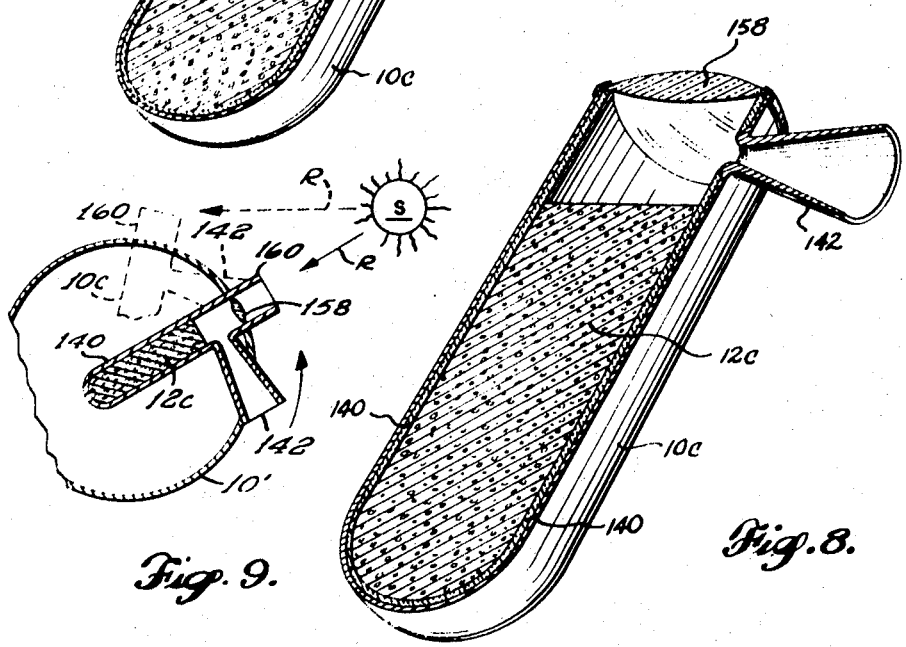

FIG. 8 is an isometric cutaway view of another form of valveless subliming solid microrocket wherein propellant flow through the nozzle is controlled by heating of the propellant surface through the admission of solar energy, providing a completely passive control system; and FIG. 9 is a fragmentary, cross-section view, in semi-diagrammatic form, illustrating a manner of satellite attitude control utilized in the form of valveless subliming solid microrocket shown at FIG. 8.

Figure 1:
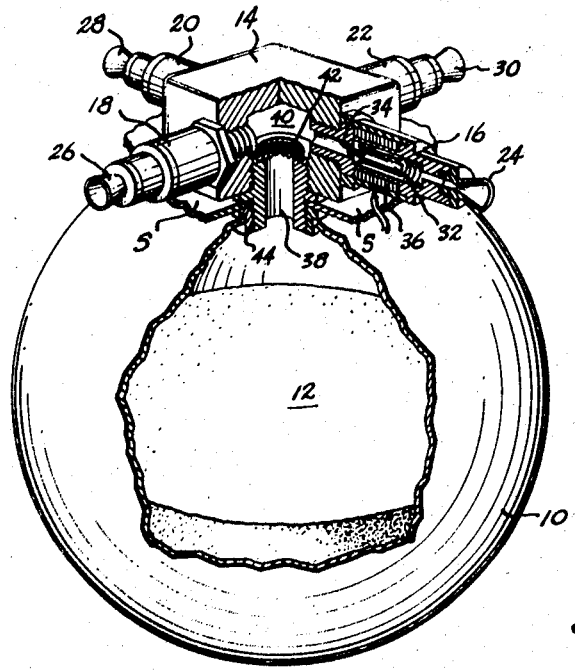
FIG. 1 is an isometric view, with various portions broken away to show interior detail, of a subliming solid control rocket involving four orthogonally related nozzles with control of propellant delivery to each of the nozzles being by separately actuatable valves.

The form of subliming solid microrocket shown in FIG. 1 comprises a propellant tank 10 of spherical configuration and constructed of a suitable lightweight material such as aluminum or glass fiber reinforced resin, for example. The subliming solid propellant, in the microrocket shown at FIG. 1, is a compressed powder cake 12 which, as will be readily understood, initially occupies substantially all of the tank 10 and gradually reduces in size by surface sublimation, the propellant cake 12 shown in FIG. 1 being in a partially depleted state. Mounted at the top of the propellant tank 10 is a thrustor block 14 in which are threadedly mounted four valve and nozzle assemblies comprising respective solenoid valves 16, 18, 20, 22, each in communication with respective nozzles 24, 26, 28, 30. Each of the valves 16, 18, 20, is a solenoid actuated coaxial type valve, conventional per se, comprising (as shown in the cutaway view of valve 16) a spring-loaded plunger 32 actuated away from the valve seat 34 by energization of solenoid coil 36. Each of the nozzles 24, 26, 28, 30 is per se of the conventional conical type. As will be apparent in FIG. 1, the flow of propellant vapor from the tank 10 into the thrustor block 14 is through threaded fitting 38 into the interior chamber 40 of the thrustor block 14, thence out whichever valve and nozzle assembly is open. In order to prevent any solid particle movement from the propellant tank 10 into the valve and nozzle assemblies, a filter screen 42 is seated in the fitting 38. Fitting 38 on which the thrustor block 14 is mounted is in turn attached to the tank 10 by threaded engagement with outlet port 44 welded to the tank 10, and a convenient manner of mounting the microrocket to the satellite which it controls is to clamp the skin or casing of the satellite between the tank outlet port 44 and the fitting 38, a fragment of the satellite casing being shown so assembled, at S.

In order to be compatible with the propellant vapor, the various flow path means for the vapor are constructed of a material not subject to chemical attack by the vapor, such as aluminum or stainless steel.

Figure 2:
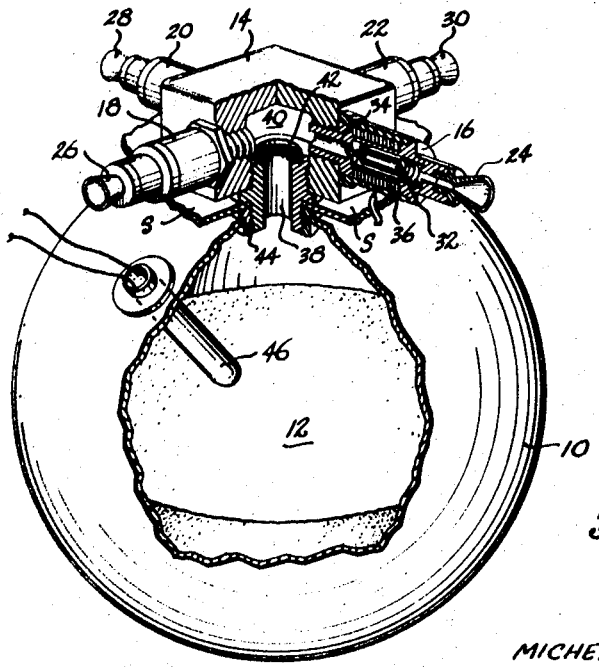
FIG. 2 is an isometric, cutaway view similar to the view of FIG. 1 showing a modified form of subliming solid microrocket system incorporating an auxiliary heating element within the propellant tank.

FIG. 2 illustrates a modified form of the subliming solid control rocket shown in FIG. 1, incorporating all of the components discussed above and further including a selectively energized electric heating element 46 threadedly mounted in the propellant tank 10 and extending into the tank 10 so as to radiantly heat the propellant cake 12 in the event operating conditions are such that auxiliary heating of the propellant is desirable or required to maintain operating vapor pressure. One of the operating characteristics of a subliming solid microrocket is that heat is required to cause the propellant to sublime, i.e. the propellant has a certain heat of sublimation requirement. In general, the necessary heat of sublimation is attained by the propellant through the propelllant tank by thermal conduction and radiation from the surroundings. However, in those cases where adequate heat cannot be drawn from the surroundings to maintain the propellant at desired operating temperature, the auxiliary heating element 46 prevents the temperature of the propellant cake 12 from falling below the desired operating level. Heating element 46 thus serves to in effect extend the maximum time during which the microrocket can be operated continuously.

Figure 3:
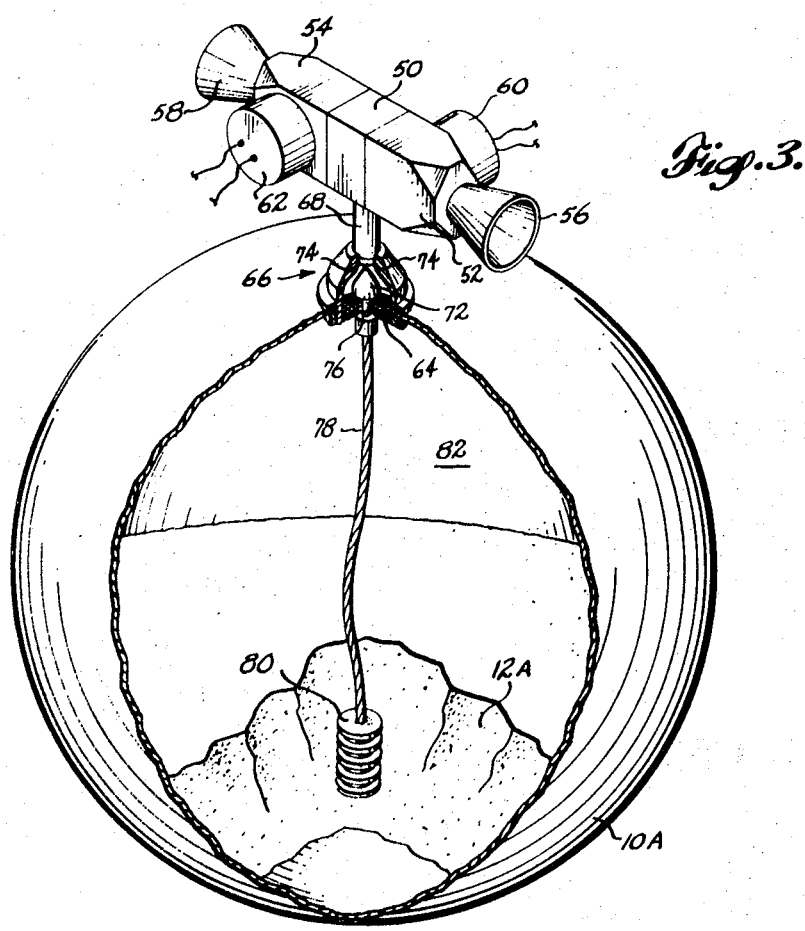
FIG. 3 is a further isometric cutaway view similar to FIGS. 1 and 2, showing a further modified form of subliming solid microrocket, incorporating two oppositely directed nozzles and a thermally controlled variable orifice functioning to maintain a substantially constant propellant mass flow during variation in propellant temperature.

FIG. 3 illustrates further typical variations in subliming solid microrocket component arrangements. In the form of rocket shown in FIG. 3, the generally spherical propellant tank 10A is partially filled with subliming solid propellant 12A, in this case in loose powder form, and the control valve nozzle assemblage comprises thrustor block 50 and respective oppositely related valves 52, 54 and nozzles 56, 58. The said valves 52, 54 are of the shear seal type, conventional per se, selectively controlled by respective solenoids 60, 62, the specific construction thereof being shown in more detail in FIG. 4 and discussed below. Nozzles 56, 58 are of a conical type, conventional per se. Flow of propellant vapor from the tank 10A to the thrustor block 50 is through a filter screen 64 and through a thermally controlled variable orifice assembly 66, then through mounting tube 68 into the manifold chamber 70 (see FIG. 4) of the thrustor block 50. The thermally controlled variable orifice assembly 66 is threadedly mounted to the top of tank 10A and the functional portions of this assembly comprise a pintle 72 facing the contoured internal wall 74 of the orifice chamber surrounding the pintle 72. Said pintle 72 is linked by a flexible push rod 76 in flexible sheath 78 leading to a temperature sensing expansion element 80 within the solid propellant 12A. The temperature sensing expansion element 80 and the thermally controlled variable orifice assembly 66 constitute a commercially available unit, conventional per se, and the operation thereof is such that with an increase in temperature at the sensing element 80, element 80 moves push rod 76 which in turn moves pintle 72 to relatively reduce the orifice area between the pintle 72 and the contoured wall 74, with the result that on the occasion of propellant flow the flow rate of propellant vapor through the orifice and into the thrustor block 50 is maintained substantially constant in spite of the change in vapor pressure of the propellant caused by change in temperature.

As an operational refinement of microrockets according to the invention, such as that shown at FIG. 3, nitrogen gas can be initially placed in the space 82 in tank 10A not occupied by solid propellant 12A, at moderate pressure (about 150 p.s.i.a., for example), in order to extend the initial pulse duration of the system without regard to providing heat of sublimation, such as often required during initial acquisition of desired satellite attitude immediately after reaching orbital velocity. In this manner, a single attitude control system can be made to optimally perform both the functions of initial attitude acquisition and of long term attitude control.

Figure 4:
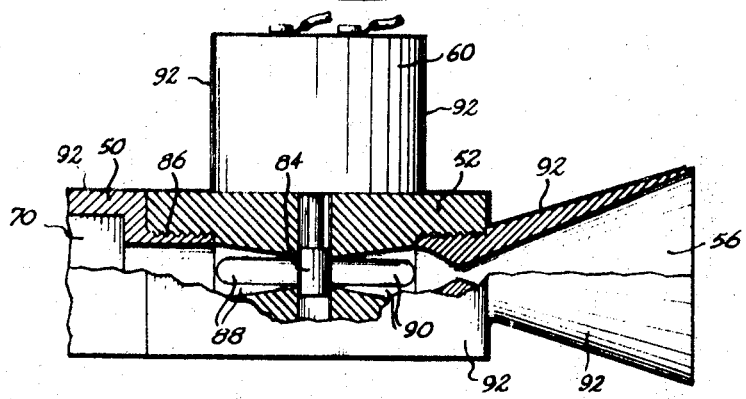
FIG. 4 is an enlarged detail view partially in cross-section and partially in elevation, showing further solenoid valve and nozzle detail of the nozzle assembly incorporated in the subliming solid microrocket shown in FIG. 3, and further illustrating a suitable technique for maintaining the valve and nozzle at somewhat higher temperature than the propellant to inhibit propellant recondensation.

FIG. 4 presents an enlarged detail view of a portion of the thrustor block 50 and the valve 52, nozzle 56 assembly shown in FIG. 3. As shown, the valve 52 is of the shear seal type, opened upon energization of solenoid 60, movement of the shear seal block 84 upwardly (as viewed) permitting propellant vapor flow from chamber 70 of the thrustor block 50 through thrustor block passage 86 and valve passages 88, 90 into the reaction nozzle 56.

One of the operational considerations with respect to a subliming solid propellant system is that all flow paths for the propellant vapor are in many cases to be maintained at a temperature which inhibits recondensation of the propellant vapor. One simple way to do this is to maintain the flow paths at a slightly higher temperature than the recondensation temperature of the propellant vapor, and as illustrated in FIG. 4 with respect to the block 50, valve 52 and nozzle 56, for example, is to provide the flow path exterior surfaces, or at least portions thereof, with a surface coating having a coefficient of thermal absorptivity causing preferential heating of the flow path elements. For this purpose, the valve and nozzle assembly shown in FIG. 4 includes a thermally absorptive coating, typically a flat black paint, as indicated at 92.

Another way in which the propellant vapor flow path means can be conveniently heated, particularly under conditions where the flow path means are exposed to a low temperature environment compared to the temperature within the propellant tank, is to provide the necessary heat by means of a small continuous current passing through the solenoid coils of the flow path valve means at a level below that required for solenoid actuation. A power input on the order of a few tenths of a watt, applied in this manner, is sufficient to maintain the valve and associated components at appropriate temperature even when the flow path components are exposed to the black background of deep space. Thus, a small heating current through the coils of solenoids 60, 62 in the system illustrated at FIG. 3, or through the solenoids of valves 16, 18, 20, 22 in the systems illustrated at FIGS. 1 and 2 can also serve to provide the flow path temperature condition desired to inhibit propellant recondensation. As will be apparent, this technique can be applied in conjunction with other forms of flow path heating means, such as the temperature absorptive coating illustrated in FIG. 4, for example.

Figures 5, 6:
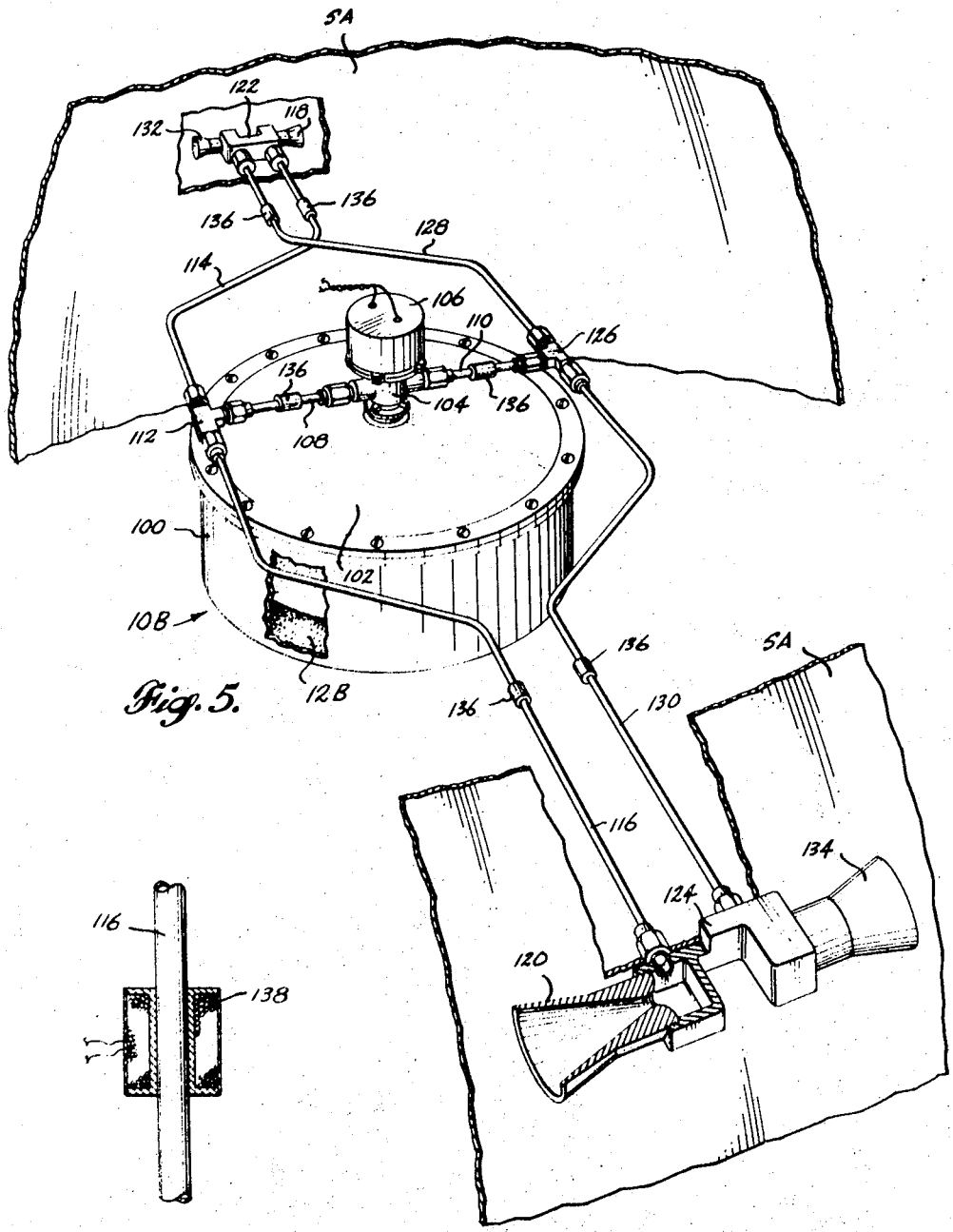
FIG. 5 is an isometric view, with portions broken away to show interior detail, of a further modified form of subliming solid microrocket system according to the present invention, specially adapted for spin control of a satellite, with oppositely related nozzles fed from a common bidirectional control valve, the system shown in FIG. 5 also incorporating a modified form of flow path heating means.
FIG. 6 is a fragmentary view of one of the propellant conduits of the rocket system shown in FIG. 5, illustrating a further modified form of flow path heating means therefor.

FIG. 5 is an isometric view, with certain portions broken away to show interior detail, of another typical component arrangement for subliming solid microrocket system characteristic of the invention, specifically configured to provide pure-couple spin control. In this system, the propellant tank, generally indicated at 10B, comprises cylinder 100 with a closed bottom and a dished cover 102 bolted in place thereon to provide a pressure enclosure for a packed powder cake 12B of subliming solid propellant. Exhaust or propellant vapor from the propellant tank 10B is controlled by means of a three-position shear seal valve 104 controlled bidirectionally by an electrically energized torque motor 106. The said valve 104 having three control positions, delivering propellant vapor to either outlet conduit 108 or outlet conduit 110 depending upon the polarity of energization of the torque motor 106, with a center control position preventing propellant flow to either outlet conduit when no energization of the torque motor 106 is provided. The three-way valve 104 and torque motor 106 shown in FIG. 5 is a commercially available unit, conventional per se, and accordingly need not be further described for an understanding of the operation thereof.

The flow path arrangement for propellant vapor delivered to conduit 108 comprises a T-fitting 112 and conduits 114, 116, respectively in communication with oppositely directed conical nozzles 118, 120 through the passageways provided in respective thrustor blocks 122, 124, each identical with the other, the nozzle 120 and its associated passageway in thrustor block 124 being cut away in FIG. 5 to show some of the interior detail thereof. Similarly, propellant vapor delivered to conduit 110 flows through T-fitting 126 and respective conduits 128, 130 to the thrustor blocks 122, 124 and nozzles 132, 134.

Mounting of the microrocket system shown in FIG. 5 in the satellite which it controls can be by suitable attachment of the thrustor blocks 122, 124 externally of the satellite casing, indicated fragmentarily at SA, the microrocket system components internally of the satellite being supported by suitable structure means, not shown.

The microrocket system shown in FIG. 5 is further characterized by utilization of a different form of propellant vapor flow path heating means than that shown in FIG. 4. Specifically, by way of further example, with respect to such flow path heating means, the various conduits 108, 110, 114, 116, 128, 130 are each provided with a sleeve 136 or the like containing radioactive material such as $Pm^{147}$ or $Pu^{238}$. Fission of the radioactive material provides a degree of thermal heating of the various conduits and associated components in thermally conductive association therewith. As will be apparent, the radioactive material to accomplish this purpose can be present in various forms other than the sleeves 136 shown, such as by being applied as internal or external films or coatings in or on the conduits or portions thereof, or as by being placed within suitable compartmentation in the valve 104 and/or the thrustor blocks 122, 124, simply by way of further example.

FIG. 6 is a fragmentary isometric view showing a further form of flow path heater means which can be used in lieu of the radioactive sleeves 136. In this heating arrangement an electric sleeve heater, suitably energized, thermally heats each conduit, such as shown in FIG. 6 at 138 with respect to conduit 116.

Figure 7:
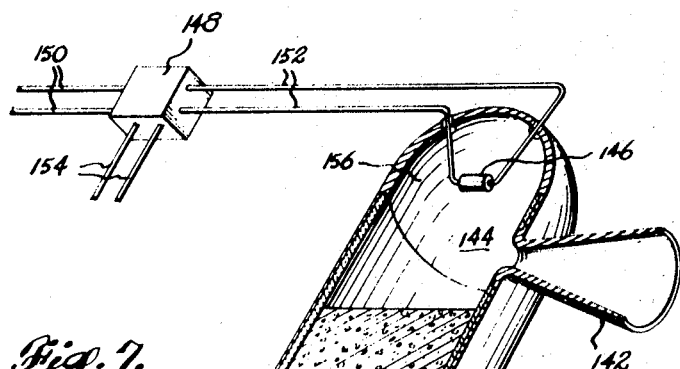
FIG. 7 is an isometric cutaway view of yet another form of sublimining solid microrocket characterizing the invention, with valveless control of propellant flow by means of selective radiant heating of the propellant surface.

FIG. 7 typically illustrates what may be termed a subliming solid microrocket of the valveless type. In this form of rocket system characteristic of the invention, the control of propellant vapor flow is solely by means of selective heating of the propellant. More specifically, in the rocket shown in FIG. 7, a generally cylindrical, round-ended propellant tank 10C is partially filled with a compacted cake 12C of subliming solid propellant, with an insulating sheath 140 being provided between the tank and propellant to prevent heat transfer to the propellant cake 12C through the wall of tank 10C. A conical reaction nozzle 142 is attached to the tank 10C at a point thereof above the propellant cake 12c the said nozzle 142 being in direct and open communication with the chamber 144 above the propellant cake 12C. Selective heating of the exposed surface of propellant cake 12C is by means of electric heating element 146, suitably energized on command, as by means of solid state power switch 148, of a type conventional per se, applying a power input from conductors 150 to the heating element 146 through conductors 152 at such time as the normally open power switch 148 receives energization from a control input applied to conductors 154. A generally hemispherical reflector 156 is preferably employed, to direct the radiant energy from heating element 146 onto the surface of the propellant cake 12C. In a case where the propellant cake 12C is relatively light in color, a small amount of finely divided particles which are darker in color, such as carbon black, can be dispersed in the propellant cake 12C in order to improve the heat absorption characteristics of the propellant cake surface.

The mode of operation of a valveless form of subliming solid microrocket such as shown at FIG. 7 is as follows. Assuming that the propellant cake 12C is at an initially ambient temperature, an initial vaporization of propellant occurs until by the loss of heat of sublimation the thermally insulated propellant cake is refrigerated to the point where the vapor pressure of the propellant is so low that substantially no propellant flow exists. This condition continues to exist as long as there is no heat input to the propellant cake. Since there is substantially no propellant flow and no thrust is being produced, this condition can be referred to as a nonoperative or "off" condition. At such time as an operating "pulse" is desired, the heating element 146 is energized and the heat input to the surface of the self-refrigerated propellant cake 12C causes localized heating of the surface thereof, producing propellant vapor by surface sublimation and vapor flow out of the open nozzle 142. This thrust producing flow of propellant vapor out the nozzle 142 can be referred to as the operating or "on" condition, which condition will continue substantially only as long as the heating element 146 remains energized. Thus, the valveless microrocket shown in FIG. 7 can be "pulsed" for any desired period simply by selective energization of the heating element 146. A primary feature and advantage of the valveless microrocket according to the present invention is that pulses of thrust are produced on command without the use of moving parts to control propellant flow. The absence of any moving parts in the system has the capability of providing extremely high unit reliability. It will be apparent that, in a valveless microrocket such as shown at FIG. 7, any type of means for selectively producing energy other than electric heating element 146 can be used to selectively generate propellant flow. By way of further examples, the selectively controllable radiant energy producing means can be: (a) a chemical reaction type heat source, such as a small oxy-hydrocarbon burner, preferably with the heat produced products of combustion being separately exhausted without introduction to the propellant tank; (b) a dielectric heating means, such as spaced dielectric plates arranged within the solid propellant or at spaced points on the insulative wall 140; (c) electroconductive heating means, such as electrodes immersed in and passing electrical current directly through the solid propellant mass; or (d) a laser type device, such as a silicon carbide crystal laser controlled by the quantity of electrical current flow through the crystal.

Yet another technique for selectively heating the surface of a valveless subliming solid microrocket to produce thrust on demand is to heat the surface with solar energy. An example of a valveless microrocket embodying this principle is presented at FIG. 8, and a somewhat diagrammatic illustration of a manner of use of such microrocket is illustrated at FIG. 9. In FIGS. 8 and 9, the tank 10C, propellant cake 12C, insulative liner 140 and nozzle arrangement 142 are arranged in the same manner as in the valveless rocket illustrated at FIG. 7, and correspondingly so designated. To provide selective heating of the exposed surface of propellant cake 12C, the end of tank 10C facing the propellant surface is provided with a light transmitting window such as quartz lens 158. FIG. 9 shows an application of this type of microrocket for satellite attitude control as shown by broken lines in FIG. 9, microrocket can be oriented on the satellite 10' in such a manner that, when correct satellite attitude is obtained, no incident sunlight rays R from solar sources S strike the quartz lens 158 and no thrust is produced by the microrocket. However, should the satellite 10' move out of correct attitude, the quartz lens 158 receives incident sunlight rays R from solar source S and the solar energy transmitted through the quartz lens 158 onto the surface of the propellant cake 12C causes surface sublimation of the propellant and the microrocket produces thrust by propellant flow through nozzle 142, returning the satellite to correct attitude, at which time the sunlight rays R no longer strike the propellant and the thrust is interrupted. It is to be noted that in this form of valveless microrocket, the control of thrust generation is entirely passive, i.e. requires no control energy producing means and no active control elements on board the satellite.

As will be evident, a suitable shield and optical system can be used in conjunction with the light transmitting quartz lens 158 to bring incident solar energy onto the solid propellant only when attitude correction is desired. For example, angle of incidence of solar energy operable to produce attitude corrective thrust can be narrowed and can have sharp angular demarkation, as by use of a light shielding tube around the lens 158, with a slotted or like aperture (not shown) at the tube end opposite from the lens if desired.

While the term "valveless" has been used to decribe the type of subliming solid rocket such as shown at FIGS. 7 and 8 where thrust generation is controlled solely by control of the energy input to the subliming solid propellant, it will be understood that use of a simple spring-loaded over pressure relief valve or the like in the propellant vapor flow path between the chamber 144 and the reaction nozzle 142, to permit exhaust of propellant vapor only when the vapor pressure is above a certain level (e.g. 0.5 p.s.i.a.), is not inconsistent with the essential "valveless" mode of propulsion control characteristic of this type of rocket and is to be considered within the scope of the present invention.

Having considered the component makeup of various subliming solid reaction jet systems characteristic of the invention, consideration will next be given to the matter of subliming solid propellant selection, including an indication of the basic properties of suitable propellants and the chemical constituency thereof.

As to the criteria for propellant selection, the important properties to be considered are vapor pressure, melting point, molecular weight of the propellant vapor, density, heat of sublimation, specific impulse, and chemical stability. With regard to vapor pressure, the subliming solid propellant must possess a significant vapor pressure at operating temperature and the operating vapor pressure should fall within certain limits to obtain optimum performance. which limits depend to a considerable extent upon the thrust level under consideration. For example, if the vapor pressure of a propellant is too high, relative to the thrust level, the throat area of the exhaust nozzle is unduly small and might tend to be obstructed should operating conditions vary considerably from those for which the system was designed. If the vapor pressure is too low, on the other hand, the nozzle throat area becomes excessively large, leading to undue weight of the nozzles, flow path conduits and valves. By way of practical limits with respect to nozzle throat diameters and vapor pressures, the propellant vapor pressure should be at least about 0.5 p.s.i.a. and preferably not over about 15 p.s.i.a. except when the desired thrust level requires a higher vapor pressure (such as the 330 p.s.i.a. vapor pressure for a thrust level of 10 pounds, using $PH_4Cl$ as the propellant, for example).

With respect to the temperature or the subliming solid propellant at which substantial propellant vapor flow through the reaction nozzle occurs, such temperature cannot be too low, otherwise the propellant will sublime under unexpected environmental conditions resulting in higher than design temperatures. The propellant should be specifically selected for each application to insure compatibilty between the propellant sublimation temperature and the expected satellite environmental conditions. In general, the sublimation temperature should be substantially above 65° F. and preferably should be at least above about 120° F.

With respect to molecular weight of the propellant vapor, it is necessary to have a reasonably good specific impulse ($I_s$), i.e. at least about 40 and preferably at least about 75 lbf./lbm./sec., in order to obtain good performance from a subliming solid propellant system. As is known, the primary physical quantity which effects the specific impulse (pounds of thrust produced per unit weight flow of propellant per second) is the molecular weight of the exhaust gases. It is desirable to have the molecular weight of the exhaust gases as low as possible. In this respect it is to be emphasized that most substances which have an appropriate vapor pressure are impractical because of the fact that the molecular weight of the substance in vapor phase is undesirably high; this is often particularly true in the case of volatile organic materials such as naphthalene. It is thus an important characteristic of most subliming solid propellants suitable for purposes of the present invention, as listed in the table below, that they reversibly decompose upon sublimation from the solid phase to form a gas phase mixture of lighter compounds. Thus, for example, ammonium hydrosulfide reversibly becomes ammonia and hydrogen sulfide in gas phase, and ammonium bicarbonate reversibly becomes ammonia, water vapor, and $CO_2$ in gas phase, with these respective gas phases having molecular weights of 25.6 and 26.4, for example. In general the molecular weight of the subliming propellant vapor should be not more than about 108, preferably should be less than about 60, and optimally should be less than about 30.

As to the density of the subliming solid propellant, it is desirable that it be as dense as possible in order to reduce the weight of the propellant tank for a given amount of propellant. In general, the density of the subliming solid propellant should be at least about 0.05 pounds mass per cubic inch.

The heat of vaporization of the propellant should be as low as possible, since this directly determines the allowable pulse length and maximum duty cycle as a function of the thrust level and amount of propellant in the tank. As will be eivedent, if the heat of vaporization is excessively large, then the self-cooling effect during the pulse becomes more pronounced. In general, the heat of vaporization of the subliming solid propellant should not exceed about 1000 B.t.u./lb.

It is also important that the propellant material exhibit chemical stability under operating and storage conditions and should not have corrosive, toxic, or other undesirable characteristics unless such can be tolerated in the environment of use.

The following is a tabulation of certain suitable subliming solid propellants for use in microrocket systems according to the present invention, such as those shown in the accompanying illustrations, together with an indication of the various above-discussed physical and chemical properties of the propellants.

TABLE—PROPERTIES OF SUBLIMING SOLID PROPELLANTS

| Subliming solid propellant | Formula | Vapor pressure at 65° F. (lbf./in.²) | Sublimation point (° F.) | Molecular weight of gas phase | Density (lbm./in.³) | Heat of sublimation (B.t.u./lb.) | Approx. theo. specific impulse ($I_s$) | Chemical stability (at 65° F.) |
|---|---|---|---|---|---|---|---|---|
| Ammonium bicarbonate | $NH_4HCO_3$ | 0.62 | Above 150 | 26.4 | 0.0572 | 929 | 84 | Stable. |
| Ammonium carbonate | $(NH_4)_2CO_3$ | 0.6 | Above 150 | 24.0 | Above 0.05 | 960 | 86 | Do. |
| Ammonium carbamate | $NH_4CO_2NH_2$ | 1.16 | Above 150 | 26.0 | Above 0.05 | 877 | 84 | Do. |
| Ammonium hydrosulfide | $NH_4HS$ | 6.37 | Above 150 | 25.6 | 0.05 | 782 | 85 | Do. |
| Ammonium sulfide | $(NH_4)_2S$ | 7.0 | Above 150 | 22.8 | Above 0.05 | | 87 | Do. |
| Ammonium cyanide | $NH_4CN$ | 7.55 | 97 | 22.0 | Above 0.05 | 825 | 87 | Do. |
| Cyanogen bromide | CNBr | 1.55 | 124 | 105.9 | 0.073 | 120 | 42 | Do. |
| Phosphonium chloride | $PH_4Cl$ | 330 | 82 | 35.2 | Above 0.05 | | 72 | Do. |
| Phosphonium bromide | $PH_4Br$ | 4.2 | Above 150 | 57.4 | Above 0.05 | | 57 | Do. |
| Phosphonium iodide | $PH_4I$ | 1.1 | 143 | 81.0 | 0.103 | | 47 | Do. |
| Sulfur trioxide | $SO_3$ | 0.87 | 144 | 80.0 | 0.071 | 366 | 48 | Do. |
| Nitrogen pentaoxide | $N_2O_5$ | 4.8 | 86 | 108.0 | 0.059 | | 41 | Do. |

Since sublimation of each of the propellants listed in the table is essentially a physical phenomenon, it will be understood that any chemically non-reactive mixtures of subliming solid propellants can also be employed if desired.

The following specific examples typify some of the design considerations involved in designing subliming solid microrockets for particular applications at various thrust levels. For a subliming solid microrocket to operate at a thrust level of $10^{-6}$ lb. at a temperature of 65° F., one good subliming solid propellant is ammonium carbonate, having a vapor pressure of 0.6 lbf./in.² at the assigned operating temperature. At this operating pressure and thrust level, a suitable nozzle throat diameter is 0.002 inch and a suitable nozzle area ratio is 100. A microrocket system designed according to these specifications has a continuous duty cycle capability.

For a subliming solid microrocket specifically designed for operation as a valveless rocket such as shown in FIG. 7 or FIG. 8, with a thrust level of $10^{-4}$ lb., a suitable subliming solid propellant is ammonium bicarbonate, providing an operating pressure of 10 p.s.i.a. with operating temperatures of −50° F. (off condition) and +130° F. (on condition). In this system, a suitable nozzle throat diameter is 0.003 inch, with a nozzle area ratio of 100. A microrocket so designed has a continuous duty cycle capability.

For a subliming solid microrocket to operate at a thrust level of $10^{-2}$ lb., a suitable propellant is ammonium hydrosulfide, providing operating pressure of 6.37 p.s.i.a. at 65° F., a suitable nozzle throat diameter in this case being 0.033 inch, with a nozzle area ratio of 100. The duty cycle capability of this microrocket system is 10%.

To illustrate a subliming solid microrocket capable of operation at a relatively high microthrust level, specifically at a thrust level of 10 pounds, a suitable propellant is phosphonium chloride, providing an operating pressure of 330 p.s.i.a. at 65° F. In this case, a suitable nozzle throat diameter is 0.15 inch, with a nozzle area ratio of 100. This microrocket has a duty cycle capability of 0.01%.

From the foregoing considerations, it will be evident that other variations, modifications and adaptations of subliming solid propellant reaction jet systems can be made. Thus, by way of further typical example, the subliming solid propellant in the form occupying the propellant tank 10 can in certain cases be crystalline or amorphous rather than particulate or powdered, and can be configured to present other than a flat exposed surface. Also, consistent with the controlling physical and chemical properties, it will be understood that other solid subliming propellants are possible, besides those listed in the table. As to those microrocket systems employing valve type control for propellant vapor flow, other forms of valves can be employed, other than the specific solenoid actuated coaxial and shear type valves disclosed. As will also be apparent, any desired reaction nozzle configuration can be employed other than the conical form of nozzle disclosed, such as the well-known "bell" type reaction nozzle. As to the manner of heating the solid propellant in the propellant tank, it will also be understood that any other form of suitable energy source can be employed, such as the energy producing means above discussed in connection with the form of rocket shown at FIG. 7. Yet another specific example in this respect, applicable where a continuous (i.e. non-controlled) heating of the subliming solid propellant is desired to maintain a relatively high level propellant vapor pressure, is the utilization of a radioactive material containing loose pellet or the like placed in the propellant tank along with a propellant.

These and other variations in component design and modes of operation of subliming solid microrocket systems embodying the invention will be apparent, within the scope of the following claims.

What is claimed is:

1. Reaction thrust producing mechanism comprising a container, a subliming solid propellant in said container, means thermally insulating said propellant from said container, a reaction nozzle in open flow communication with the propellant in said container, and control means for selectively producing substantial propellant vapor flow through said nozzle or for stopping such propellant flow, said control means comprising solid propellant heating means spaced from the surface of said solid propellant and operable to radiantly heat such surface, the said propellant being characterized by loss of heat of sublimation incident to vaporization of propellant so that the propellant surface is self-refrigerated to the point where the vapor pressure of the propellant is so low that substantially no propellant vapor flow occurs through said reaction nozzle in the absence of applied heat.

2. Mechanism according to claim 1, wherein the said solid propellant heating means comprises a selectively controllable radiant energy heat source, arranged within said container and spaced from said propellant to cause surface sublimation thereof by radiantly heating such surface.

3. Mechanism according to claim 2, wherein said radiant energy heat source comprises an electrical heating element.

4. Mechanism according to claim 2, wherein said radiant energy heat source is positioned within said container and the interior surface of said container above the surface of said propellant at least partially comprises energy reflection means.

5. Mechanism according to claim 1, wherein the said solid propellant heating means comprises a light transmitting means forming a part of said container and situated to transmit incident sunlight to the surface of said propellant, the solar energy thereby transmitted to the solid propellant radiantly heating the surface of the propellant and causing substantial sublimation from the surface thereof.

6. Mechanism according to claim 5, comprising tubular shielding means arranged in conjunction with said light transmitting means to shield said light transmitting means from receiving incident sunlight except when the sunlight source is in substantial axial alignment with said tubular shielding means.

7. Reaction thrust producing mechanism comprising a container, a subliming solid propellant in said container, means thermally insulating said propellant from said container, a reaction nozzle in open flow communication with the propellant in said container, and heating means for selectively heating the surface of said propellant, with substantial propellant vapor evolving from the surface of the propellant and flowing through said reaction nozzle upon energization of said heating means, and with propellant vapor flow substantially ceasing after de-energization of said heating means through energy loss by reason of the heat of sublimation requirement of the subliming propellant vapor, the consequent loss of heat by the propellant operating to cool the propellant surface to the point where substantially no propellant vapor flow occurs through said reaction nozzle.

8. Mechanism according to claim 7, wherein said propellant has a molecular weight in vapor phase of not more than about 108 and a substantial vapor pressure at 65° F.

9. The method of reaction thrust generation by gas flow through a reaction nozzle, said method comprising: arranging a confined, thermally insulated subliming solid propellant in open flow communication with said nozzle and allowing the subliming solid to self-refrigerate by reason of the heat of sublimation requirement of the subliming propellant vapor, such self-refrigerating occurring until substantially no further flow of propellant vapor occurs; and producing a thrust pulse by applying thermal energy to the surface of said solid propellant to cause substantial sublimation of the propellant surface and flow of propellant sublimed vapor through said reaction nozzle.

10. The method of reaction thrust generation according to claim 9 comprising applying thermal energy to the subliming solid propellant by selectively controlling radiant energy producing means to radiate the surface of said solid propellant.

11. The method of reaction thrust generation according to claim 10, comprising electrically energizing said radiant energy producing means.

12. The method of reaction thrust generation according to claim 9, wherein the radiant energy radiating the surface of said solid propellant comprises energy in the visible light spectrum.

13. The method of reaction thrust generation according to claim 9, comprising radiating the surface of said solid propellant with solar energy.

14. The method of space vehicle attitude control comprising: orienting a microrocket containing sublimable solid propellant on the vehicle with a light transmitting window in the propellant container arranged to be shielded from incident solar energy when the vehicle is in desired attitude with respect to a solar energy source, the said solid propellant being essentially thermally insulated from the ambient environment and in the absence of applied energy being characterized by a loss of heat of sublimation incident to vaporization of propellant so that the propellant surface is self-refrigerated to the point where the vapor pressure of the propellant is so low that substantially no propellant vapor flow occurs through the reaction nozzle of the microrocket; and generating attitude correcting thrust by propellant vapor flow through such reaction nozzle when said space vehicle is out of desired attitude by radiating at least part of the surface of said sublimable solid propellant with incident solar energy transmitted through the said light transmitting window.

15. The method of claim 14, wherein said light transmitting window is a quartz lens.

References Cited
UNITED STATES PATENTS

| | | | |
|---|---|---|---|
| 2,816,419 | 12/1957 | Mueller | 60—37 |
| 3,064,418 | 11/1962 | Sanders | 60—35.5 |
| 3,135,703 | 6/1964 | Sill | 60—35.5 |
| 3,159,967 | 12/1964 | Webb | 60—35.5 |
| 3,177,651 | 4/1965 | Lawrence | 60—35.6 |
| 3,210,930 | 10/1965 | Leeper et al. | 60—35.6 |

CARLTON R. CROYLE, Primary Examiner

U.S. Cl. X.R.
60—200, 204, 229